United States Patent [19]

Perry et al.

[11] Patent Number: 4,594,712
[45] Date of Patent: Jun. 10, 1986

[54] REMOTE DATA LINK TRANSMIT DATA FORMATTER

[75] Inventors: Thomas J. Perry, Phoenix; Muhammad I. Khera, Glendale, both of Ariz.

[73] Assignee: GTE Automatic Electric Inc., Northlake, Ill.

[21] Appl. No.: 564,133

[22] Filed: Dec. 22, 1983

[51] Int. Cl.$^4$ .................................. G06F 11/00
[52] U.S. Cl. .................................. 371/49; 371/50
[58] Field of Search .................. 371/49, 50, 51, 52, 371/54; 364/200, 900

[56] References Cited

U.S. PATENT DOCUMENTS

| | | | |
|---|---|---|---|
| 3,648,256 | 3/1972 | Paine | 371/49 |
| 3,680,050 | 7/1972 | Griffin | 371/49 |
| 3,701,892 | 10/1972 | Carter et al. | 371/49 |
| 3,831,144 | 8/1974 | En | 371/50 |
| 3,914,741 | 10/1975 | Bonser et al. | 371/49 |
| 4,092,522 | 5/1978 | Miller | 371/49 |
| 4,155,070 | 5/1979 | Munter | 371/49 |
| 4,346,474 | 8/1982 | Sze | 371/49 |
| 4,433,388 | 2/1984 | Oosterbaan | 371/49 |

OTHER PUBLICATIONS

IEEE Standard Dictionary of Electrical and Electronics Terms, IEEE STD 100-1977.

*Primary Examiner*—Michael R. Fleming
*Attorney, Agent, or Firm*—Anthony Niologos; Peter Xiarhos

[57] ABSTRACT

A transmit data formatter is provided for assembling a plurality of 8-bit data bytes into a data message containing a plurality of message bytes. The transmit data formatter includes a receive buffer which receives a data byte from a peripheral processor. A parallel to serial converter receives the data byte from the receive buffer and outputs the data byte serially. A serial to parallel converter receives the serial data byte and assembles the data byte into a partial message byte when seven data bits have been received. A horizontal parity generator connected to the parallel to serial converter develops a horizontal parity bit which is appended to the seven data bits forming a message byte.

6 Claims, 9 Drawing Figures

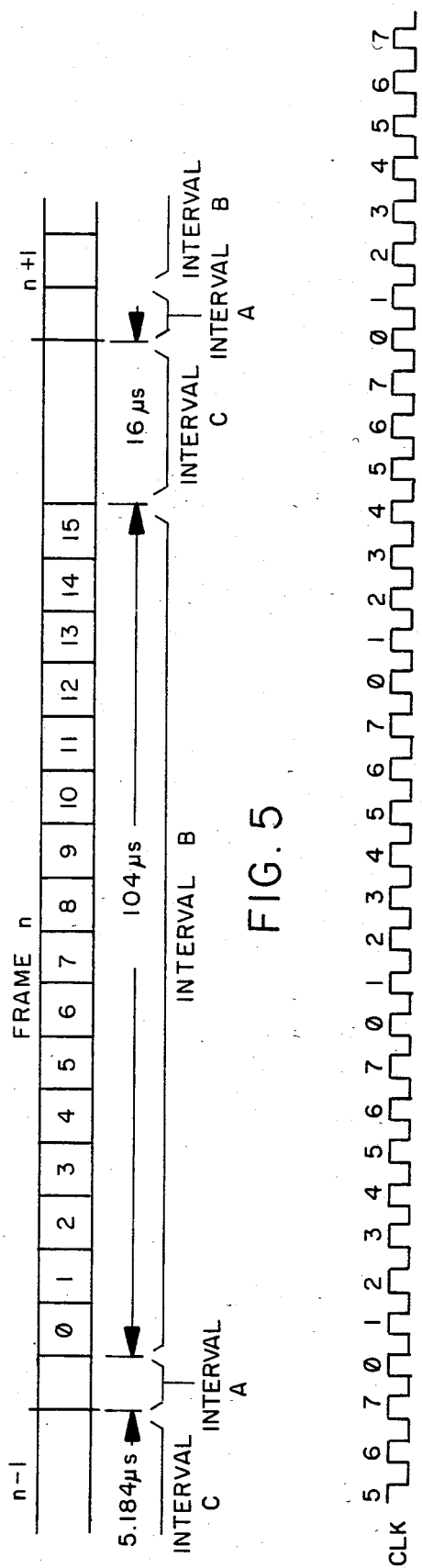
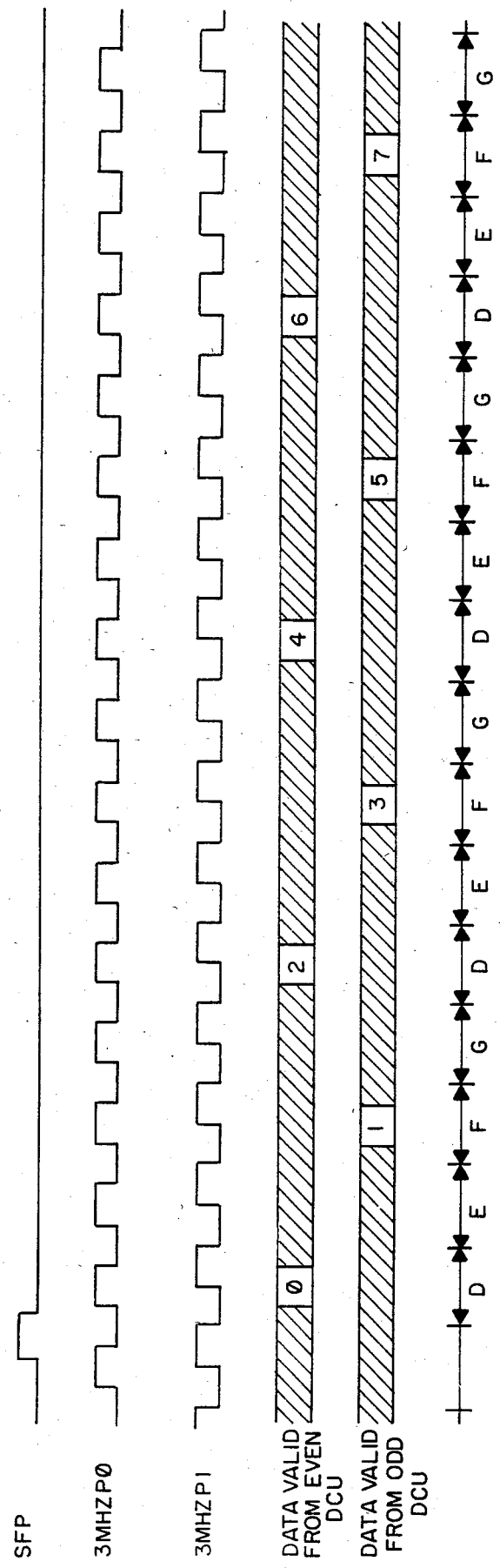
FIG. 5
FIG. 6

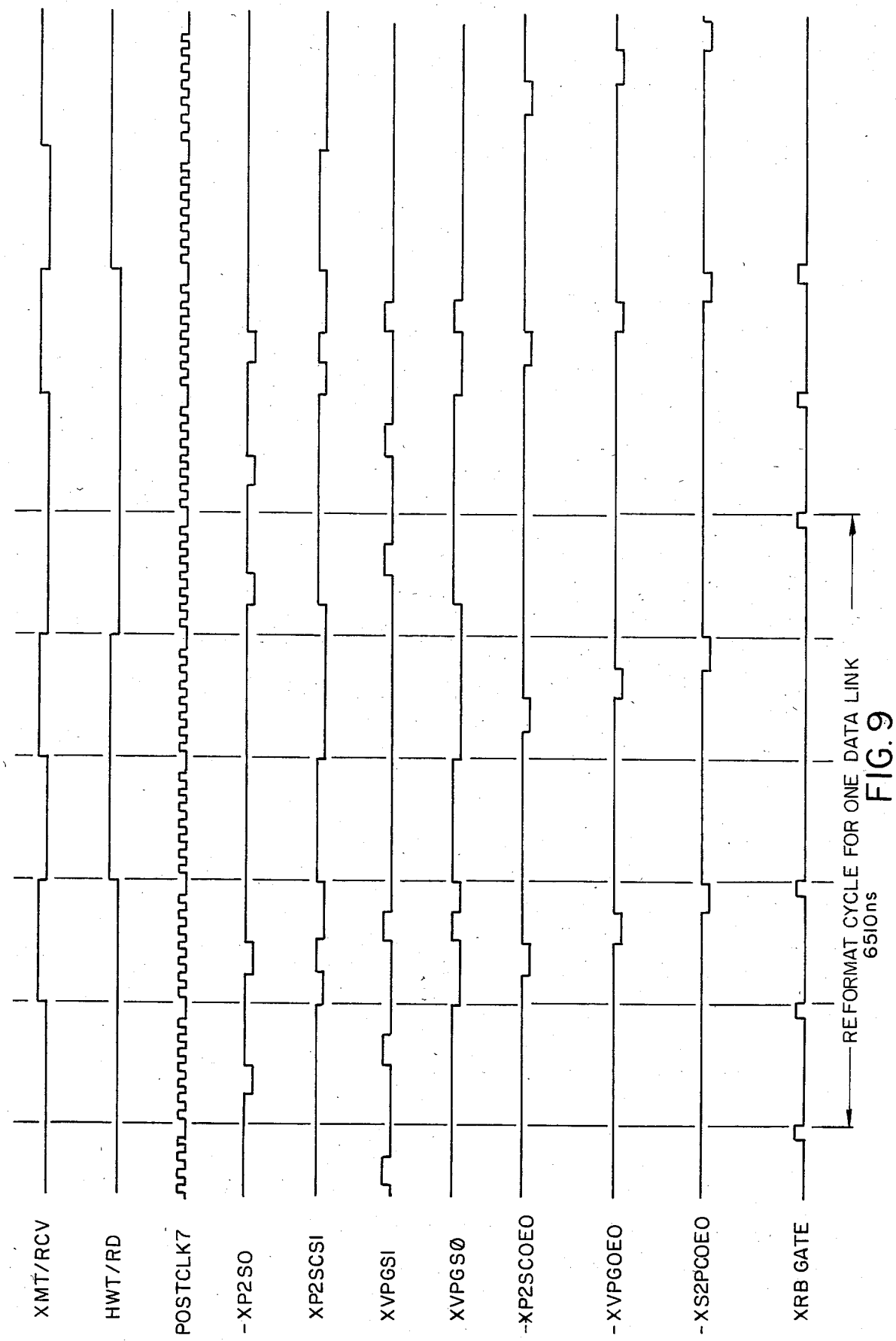

REMOTE DATA LINK TRANSMIT DATA FORMATTER

CROSS-REFERENCE TO RELATED APPLICATIONS

The present application is related to the following co-pending U.S. patent applications all having the same inventive entity and being assigned to the same assignee:

U.S. patent application Ser. No. 564,134, titled, "A Remote Data Link Controller;"

U.S. patent application Ser. No. 564,138, titled, "A Remote Data Link Controller Having Multiple Data Link Handling Capabilities;"

U.S. patent application Ser. No. 564,135, titled, "A Remote Data Link Receive Data Reformatter;"

U.S. patent application Ser. No. 564,136, titled, "A Remote Data Link Address Sequencer and a Memory Arrangement for Accessing and Storing Digital Data;"

U.S. patent application Ser. No. 564,137, titled, "A Data Format Arrangement for Communication Between the Peripheral Processors of a Telecommunications Switching Network."

BACKGROUND OF THE INVENTION

The present invention relates in general to data transmission between the switching systems of a telecommunications network and more particularly to an arrangement for formatting control data.

In modern digital telecommunication switching systems a concept of network modularity has been designed allowing the interconnection of small switching systems remote to a larger host system. These remote switching systems have capacities to handle between a few hundred and a few thousand telephone subscribers. The remote switching systems are normally used in areas where the installation of a large switching system would be uneconomical.

A high speed digital data link typically interfaces the host switching system to the remote system through which large amounts of voice and control data are exchanged. The voice data normally comprises subscriber calls switched through either the host or the remote system. The control data may be status exchanges between the host and the remote, i.e. centralized administration, billing and maintenance, or the direct control of the operation of the remote by the host.

The control data exchanges are originated in the sending system peripheral processor transmitted over the high speed digital data link to the receiving system peripheral processor where the data is interpreted. In order to relieve each peripheral processor from the burden of controlling the data link a remote data link controller is implemented in each system which performs all tasks involved in the formatting, transmission and reception of the control data.

The remote data link controllers are connected to each other via digital spans. These digital spans may be T1, T2 or T1C, T3 carriers using DS1, DS2 or DS1C, DS3 data formats, respectively. These digital spans transmit data at high speeds serially at a rate of approximately 1.5–45 megabits per second.

Typically the transmitting peripheral processor outputs data words to the link controller where the data words are assembled or formatted into a data message or packet. The packet is then transmitted to the receiving link controller where the data message is reformatted back into data words readable by the receiving peripheral processor.

Accordingly, it becomes the object of the present invention to provide an efficient transmit data formatter for the assembly of data words into a transmitted data message.

SUMMARY OF THE INVENTION

In accomplishing the object of the present invention there is provided a transmit data reformatter for a telecommunications switching system used to assemble a plurality of 8-bit data bytes into a data message. The data message normally contains a plurality of message bytes, each message byte having seven data bits and a parity bit. The transmit data formatter of the present invention is used in a telecommunications switching system which includes a peripheral processor, an output buffer arranged to receive and store the data bytes from the peripheral processor and a temporary memory.

The transmit data formatter of the present invention comprises a receive buffer connected to the output buffer and arranged to receive and store in parallel form a data byte from the output buffer when the transmit buffer is empty. The receiver buffer is connected to a parallel to serial converter which receives the data byte from the receive buffer and outputs the data byte serially. The serial to parallel converter is connected to a parallel to serial converter which receives the serial data and assembles the serial data into a partial message byte after seven data bits have been input. Simultaneously, the serial data output by the parallel to serial converter is applied to the input of a horizontal parity generator. The horizontal parity generator inputs the serial data and outputs a parity bit after seven data bits have been input. The parity bit is then appended to the partial message byte forming a message byte.

The message byte is then transferred to the temporary memory. The temporary memory stores the completed message byte until a transfer period where it is output over a digital link.

Normally, after a message byte has been assembled there may remain a number of data bits in the parallel to serial converter. These data bits are output to the temporary memory after one message byte has been assembled. When a second message byte is to be assembled these remaining bits are brought out of temporary memory and inserted into the parallel to serial converter where they are output serially to the serial to parallel converter. A second data byte input from the receive buffer to the parallel to serial converter is output and added to the remaining data bits in the serial to parallel converter thereby, assembling a second data byte.

Any remaining bits in the parallel to serial converter are transferred to the temporary memory and this process repeated until 64 bits of data have been assembled into a data message.

BRIEF DESCRIPTION OF THE DRAWINGS

FIG. 5 is a detailed time utilization diagram of the remote data link channel as shown in FIG. 2.

FIG. 6 is a remote data link controller transfer timing diagram.

FIG. 9 is a timing diagram showing the control signals used by the transmit formatter.

DESCRIPTION OF THE PREFERRED EMBODIMENT

Figure 1:
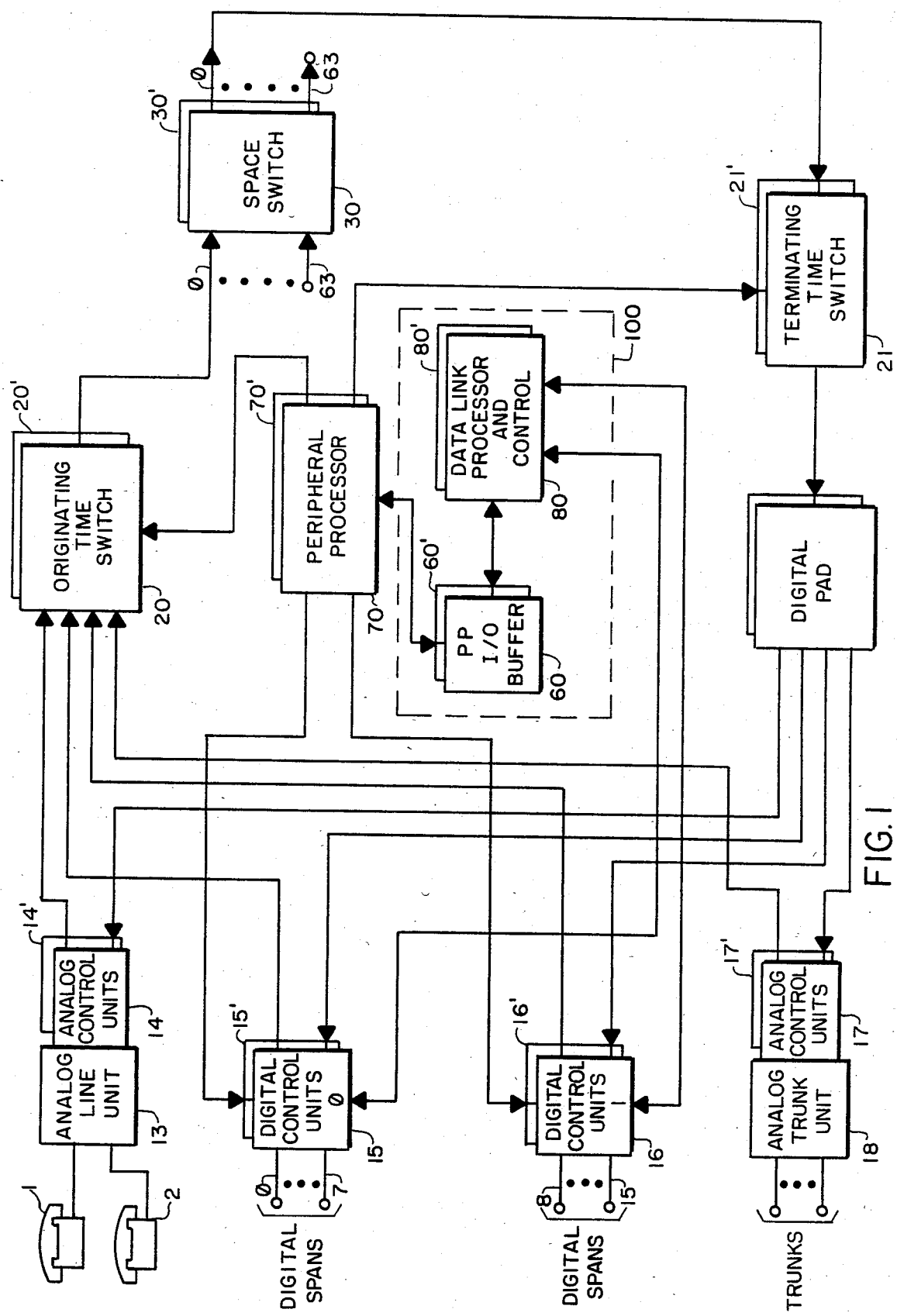
FIG. 1 is a block diagram of a telecommunications switching system embodying the present invention.

Referring to FIG. 1, a time-space-time digital switching system along with the corresponding common control is shown. Telephone subscribers, such as subscribers 1 and 2, are shown connected to analog line unit 13. Analog line unit 13 is connected to both copies of the analog control unit 14 and 14'. Originating time switches 20 and 20' are connected to a duplex pair of space switch units 30 and 30' which are in turn connected to a duplex pair of terminating time switches 21 and 21'. Terminating time switches 21 and 21' are connected to analog control units 14 and 14' and ultimately to the telephone subscribers 1 and 2 via analog line circuit 13. Digital control units 15, 15' and 16, 16' connect the digital spans to the switching system. Digital span equipment may be implemented using a model 9004 T1 digital span, manufactured by GTE Lenkurt, Inc. Similarly, analog trunk unit 18 connects trunk circuits to the digital switching system via analog control units 17 and 17'.

A peripheral processor CPU 70 controls the digital switching system and digital and analog control units. Analog line unit 13 and duplex pair of analog control units 14 and 14' interface to telephone subscribers directly. A duplicate pair of digital control units 15, 15' and 16, 16' control the incoming PCM data from the digital spans. Similarly, the analog trunk unit 18 and a duplex pair of analog control units 17 and 17' interface to trunk circuits. The analog and digital control units are each duplicated for reliability purposes.

The network of FIG. 1 also includes a REMOTE DATA LINK CONTROLLER (RDLC) 100 which provides formatting and control of data transmitted and received between the peripheral processors of two or more switching systems. The RDLC can provide up to 16, 64 kilobits per second data links arranged for full duplex operation and is configured so that it can provide one full duplex data link for each of the 16 T1 spans. RDLC 100 can operate together with one or two digital control units (DCU), with each DCU capable of providing up to eight T1 carrier facilities.

RDLC 100 includes a duplicated data link processor and control 80 and 80' and a duplicated peripheral processor (PP) I/O buffer 60 and 60'.

Prior to examining the detailed operation of the RDLC 100, it is helpful to understand the format and protocol of the messages which are transmitted and received by the RDLC. Each message consists of eight, 8-bit bytes of data for a total of 64 bits. The peripheral processor I/O buffer provides four transmit message buffers and four receive message buffers for each of the 16 possible data links.

Normally, peripheral processor software writes a message into a transmit message buffer of PP I/O buffer 60 and 60' associated with a data link and then issues a transmit command to data link processor and control 80 and 80'. The data link processor and control 80 and 80' responds by taking the message out of the transmit message buffer, formatting the data so that it can be transmitted over a T1 carrier and then transmits the message to the distant end of the data link through the appropriate DCU and digital span.

When a message is received, the data link processor and control 80 and 80' reformats the received data and places the mesage into an appropriate receive message buffer in the PP I/O buffer 60 and 60'. Data link processor and control 80 and 80' then causes an interrupt, alerting peripheral processor 70 and 70' to the fact that a message has been received. The RDLC will queue up to three received messages for each data link. It should be noted that under normal conditions the RDLC functions in a duplex configuration, that is, it matches all outgoing signals performed in the DCUs. With this arrangement there is one RDLC circuit for each of the two copies of the DCUs.

Figure 2:
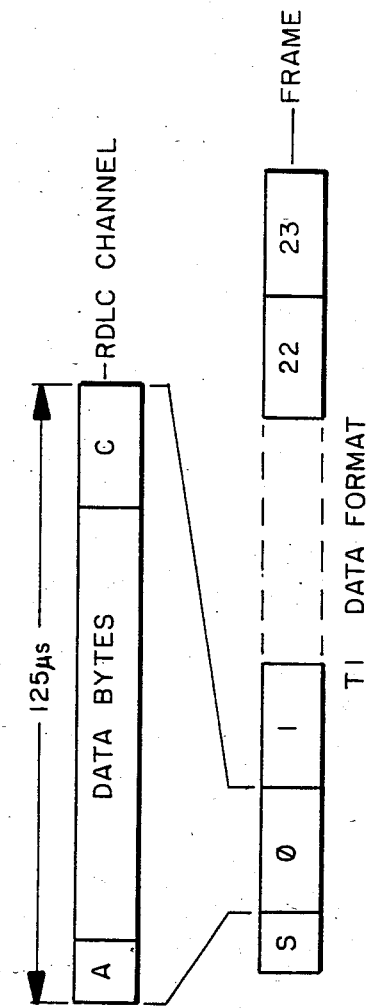
FIG. 2 is a bit map of a remote data link channel and frame of a T1 data span.

The nature of a T1 data and its format is shown in FIG. 2. Normally, each T1 span transmits and receives voice samples organized together into a frame. Each frame includes 24 voice samples with each voice sample associated with one channel of voice (or data). The channels are numbered 0–23. Normally, the RDLC will insert its data bytes in channel 0. The S bit carries a periodic pattern which, when detected, is used to identify the beginning of each frame of data.

Figure 3:
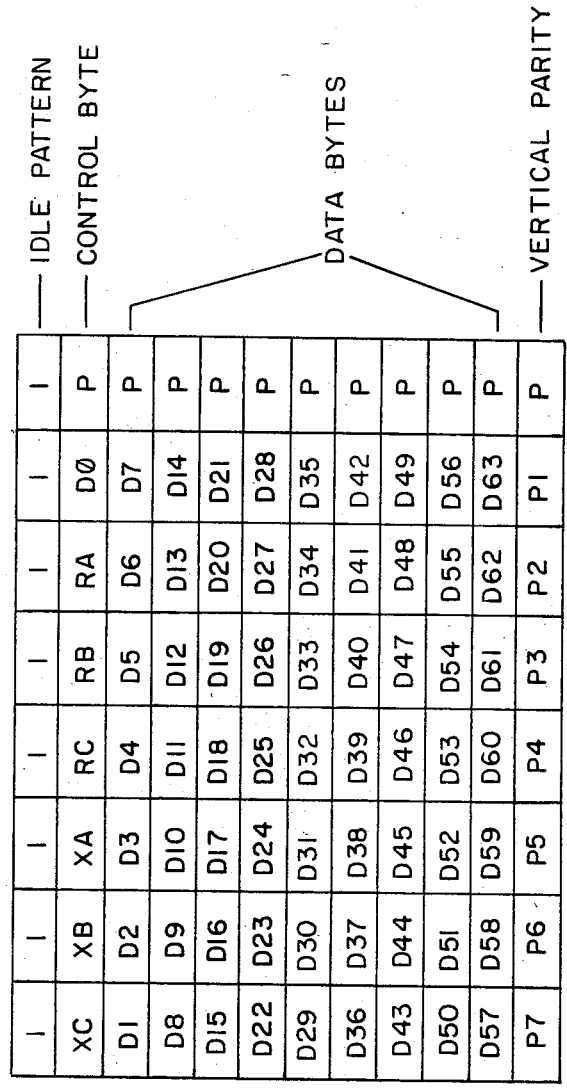
FIG. 3 is a bit map representation of a formatted data message used in the present invention.

Turning to FIG. 3, the complete data format for one message is shown. The data format is byte oriented with one 8-bit byte being tranmitted during each T1 data frame for each data link. When the link is idle and not transmitting the transmitter sends idle patterns consisting of all ones. The beginning of a message is indicated by sending a control byte containing one or more zeros which may contain information conveying the sequence number of messages transmitted or received and/or acknowledgments between the RDLCs. As can be seen in FIG. 3 only six control bits are used (XC, XB, XA, RC, RB, RA) in the control byte. The first data bit to be transmitted is inserted in the bit 1 position of the control byte. The control byte further includes an odd parity bit in bit position 0. The next nine bytes contain the remaining 63 bits of data, each byte containing seven bits of data plus an odd parity bit. The final message byte contains seven vertical parity bits plus an odd parity bit for the vertical parity byte. Each vertical parity bit provides even parity for ten of the preceding bits, i.e. P1 for bit 1 in each of the preceding ten bytes, P2 for bit 2, P3 for bit 3, etc. The next byte will contain idle pattern.

It should be noted that the idle pattern is unique in that it has even parity. This makes it easy for the receiver to synchronize with the incoming data stream and greatly reduces the chance that a receiver would accept an incorrect message because of improper synchronization.

Figure 4:
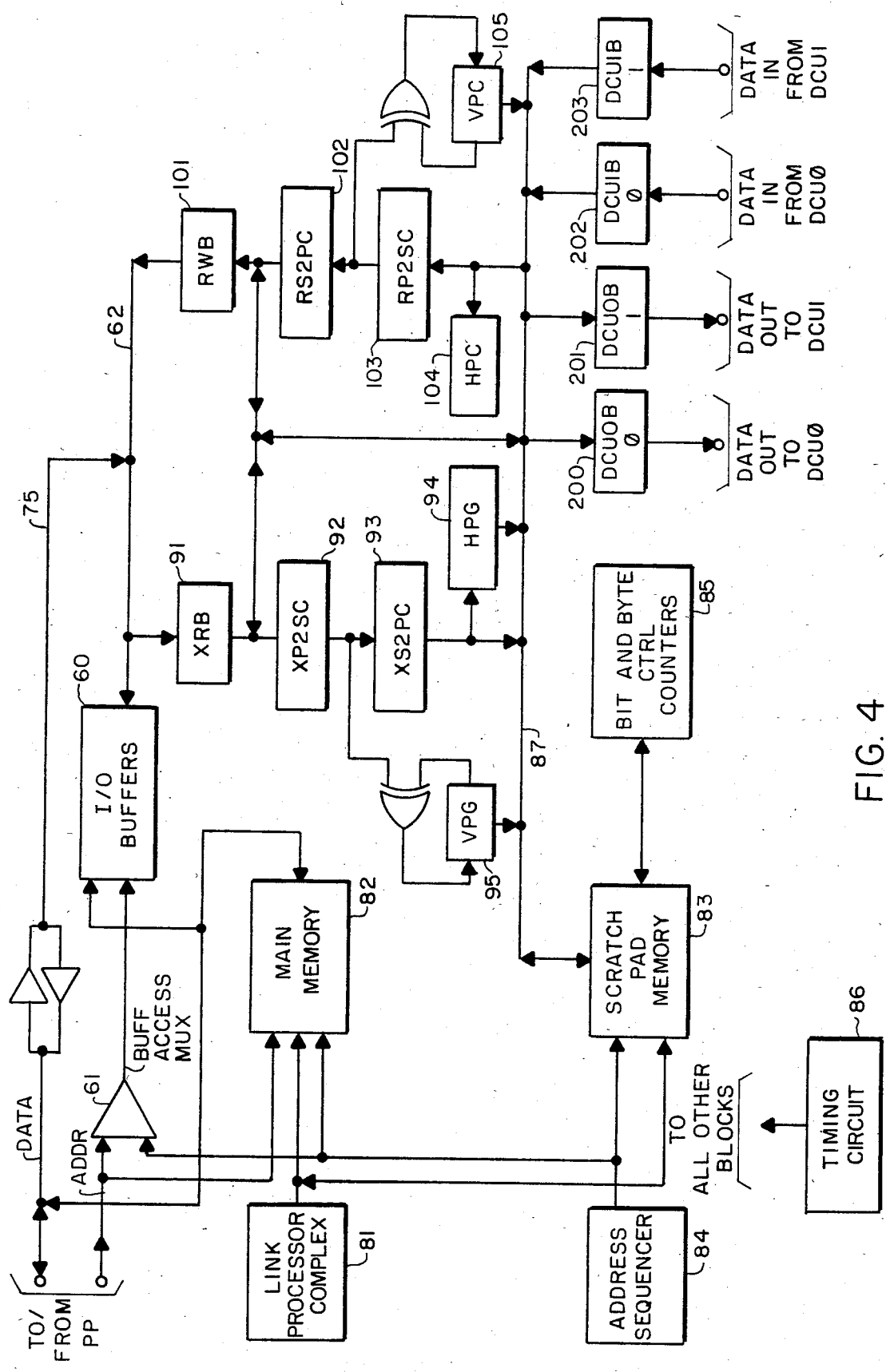
FIG. 4 is a detailed block diagram of the remote data link controller including the transmit formatter of the present invention.

Turning now to FIG. 4, a block diagram of the Data Link Processor and control 80, 80' of RDLC 100 is shown. The link processor complex 81 includes an Intel 8085A microprocessor together with associated read only memory (ROM), address and data latches and timing and control circuitry. The processor under control of the program in ROM simply controls the operation of the RDLC. Main memory 82 is a 256×8 bipolar random access memory (RAM) arranged for shared access by the link processor complex 81, the peripheral processor (PP) and the address sequencer 84. The link processor complex 81 uses main memory 82 as its primary read/write memory. The PP uses it for a status and control function.

Both the PP and the address sequencer 84 do a prefetch of a 2-bit page address from the main memory 82 prior to accessing the I/O buffers 60. This page address is used to identify which of the four buffers associated with a single data link will actually be accessed during the I/O buffer access.

Buffer access multiplexers 61 are a set of multiplexers and tri-state drivers which allow the RDLC hardware to share access to the I/O buffers 60 with software access from the PP. The I/O buffers 60 are a 1K random access memory (RAM) containing the four transmit and the four receive message buffers for each of the 16 data links.

Intermediate data is stored in scratch pad memory 83 with which is addressed by counters in address sequencer 84. Address sequencer 84 also provides control hardware sequencing to the rest of the RDLC. Bit and byte control counters 85 determine which bit of which byte is actually being processed at any given instant by the transmit formatter and receive reformatter.

The transmit formatter comprises elements 91 through 95 and is the circuitry that takes the 8-bit bytes from the I/O buffer 60 transmit buffers and converts them to the 7-bit plus parity format that is transmitted. The receive reformatter elements 101 through 105 is the circuitry that takes the incoming data and converts it back into the 8-bit bytes placed into the receive buffers of I/O buffer 60.

The timing circuit 86 is a read only memory driven, finite state machine arranged to generate periodic signals used for timing and synchronization within the RDLC.

Turning now to FIG. 5, the overall timing that repeats for every frame is shown. As can be seen the frame is divided into three intervals. Interval A, interval B and interval C. During interval A, the RDLC devotes all resources to the task of transferring data to and from the DCUs. Data for all 16 data links is exchanged during this 5.184 microsecond interval. No processing of data occurs during this time, however the peripheral processor may access the I/O buffer 60 or the main memory 82 for status information. During interval B, the RDLC devotes its time to processing data; handling link 0, then link 1 and so on for all 16 links. Within each frame, each link handles one transmit and one receive data byte. The RDLC takes 6.48 microseconds to process both transmit and receive data for one link, requiring about 104 microseconds for all 16 links. During interval C, the RDLC reformatters do nothing except wait for the beginning of the next frame. This waiting period lasts approximately 16 microseconds. Therefore, the entire RDLC channel within each frame lasts approximately 125 microseconds.

Turning to FIG. 6 and FIG. 4, a closer look at the timing during interval A is shown. During interval D, data is valid from the even DCU and is transferred to the even DCU input buffer (DCUIB) 202. Simultaneously, a read access to the scratch pad memory 83 extracts the next output byte which is transferred to the even DCU output buffer (DCUOB) 200. During interval E, a received input byte from the even DCU input buffer DCUIB 202 is transferred to the scratch pad memory 83 for the appropriate data link. Simultaneously, the odd DCU will extract data from a DCU output buffer DCUOB 200 in preparation for transmitting it. During interval F, a transmitter output byte is transferred from the scratch pad memory 83 to the odd DCU output buffer DCUOB 200. Simultaneously, data is transfered from the odd DCU into the associated odd DCU input buffer DCUIB 203. During interval G, the even DCU takes data from its associated DCU output buffer DCUOB 200 in preparation for transmitting it. Simultaneously, a receive input byte from the odd DCU input buffer DCUIB 203 is transferred into the scratch pad memory 83.

Much of the activity on the RDLC takes place during the reformatting interval (Interval B). This interval is divided into 16 reformatting cycles. During each reformatting cycle, one byte of transmit data and one byte of received data is reformatted for one data link. During the 16 cycles data for each of the 16 data links is processed one data link per cycle. Therefore, the RDLC processes one transmit and one receive message byte per reformatting cycle for one data link. It stores any intermediate results in the scratch pad memory 83 and then proceeds to serve the next data link. Fetching intermediate results from the scratch pad memory, processing the data, and storing the next intermediate results and so on until the RDLC has served all 16 data links. The scratch pad memory 83 therefore provides storage for the transient state information (intermediate results) that is necessary to keep track of what each of the individual data links is doing. This information is updated once every frame or 125 microseconds.

With renewed reference to FIG. 4, a general operating explanation will be given for the transmit formatter. Transmit data from the PP is processed in the following manner. A message byte from the PP is loaded into the I/O buffer 60 and transferred into the transmit read buffer (XRB) 91 over I/O buffer bus 62 where it is available for further processing. The XRB provides an asynchronous interface between I/O buffer 60 and the transmit parallel to serial converter (XP2SC) 92. The XRB 91 ensures that data is always immediately available to the XP2SC 92 without any contention with PP accesses. The XRB 91 may be thought of as providing a look ahead or data prefetch for the XP2SC 92. Data left over from a previous reformatting cycle is loaded into XP2SC 92 from the scratch pad memory 83.

A byte of data is transferred into XP2SC 92 from XRB 91 when XP2SC 92 is empty. Simultaneously, the transmit bit counter in the bit and byte control counters 85 is reset to 0. Each time a bit is shifted out of the XP2SC 92, the transmit bit counter is incremented. When the transmit bit counter counts up to eight, it indicates that XP2SC 92 is empty and the above explained process repeats itself.

Data shifted out of XP2SC 92 is transferred to the transmit serial to parallel converter (XS2PC) 93 and horizontal and vertical parity is generated for them by HPG 94 and VPG 95 respectively. When seven data bits have been accumulated in the XS2PC 93 the contents of the HPG 94 is appended to the seven data bits to form an 8-bit byte which is transferred to the scratch pad memory 83 over scratch pad bus 87. During channel 0 of the appropriate frame the data byte in the scratch pad memory 83 is written into the appropriate DCUOB 200, 201 and passed to the DCU and subsequently transmitted over the T1 carrier.

Figure 7:
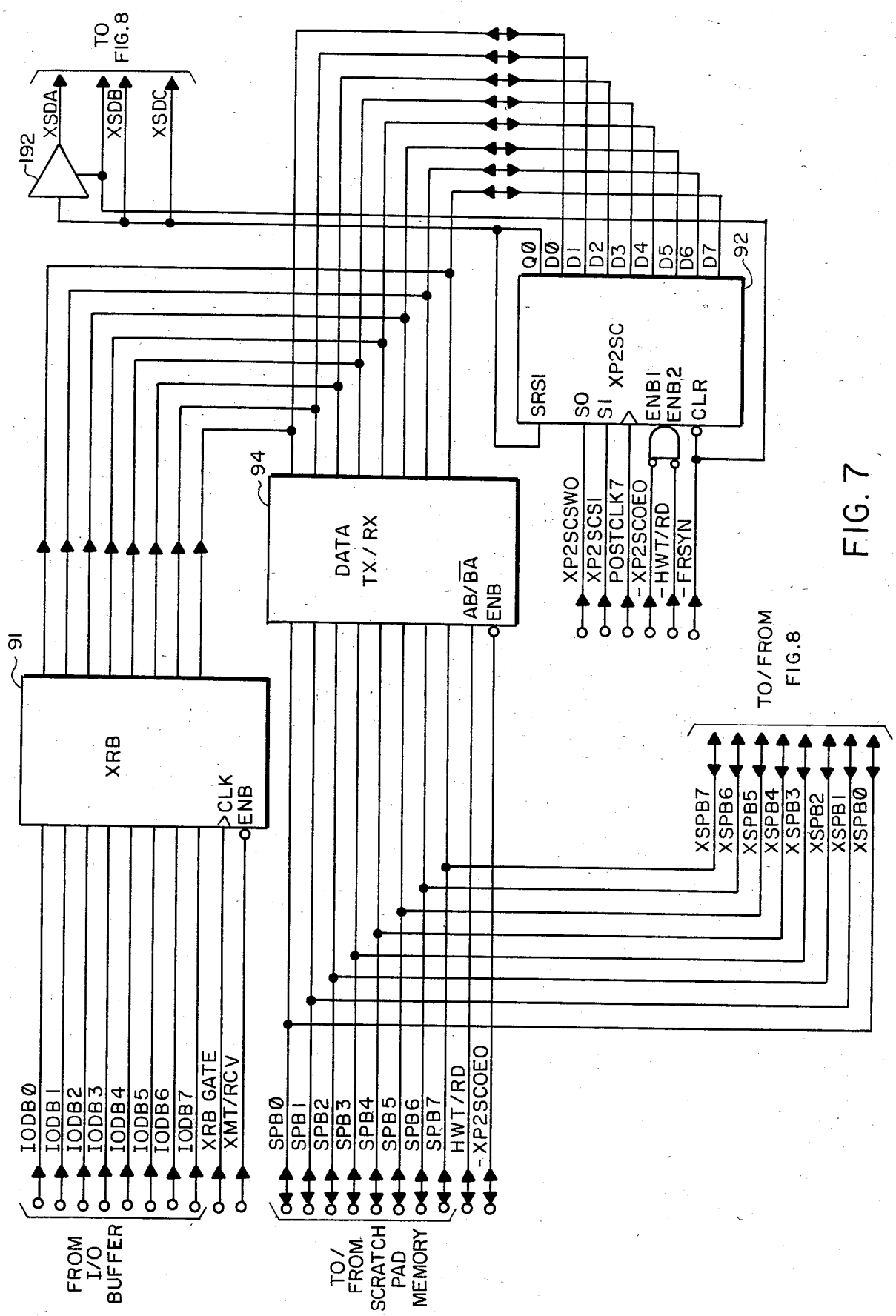
FIG. 7 is a first detailed schematic of the remote data link transmit formatter of the present invention.
Figure 8:
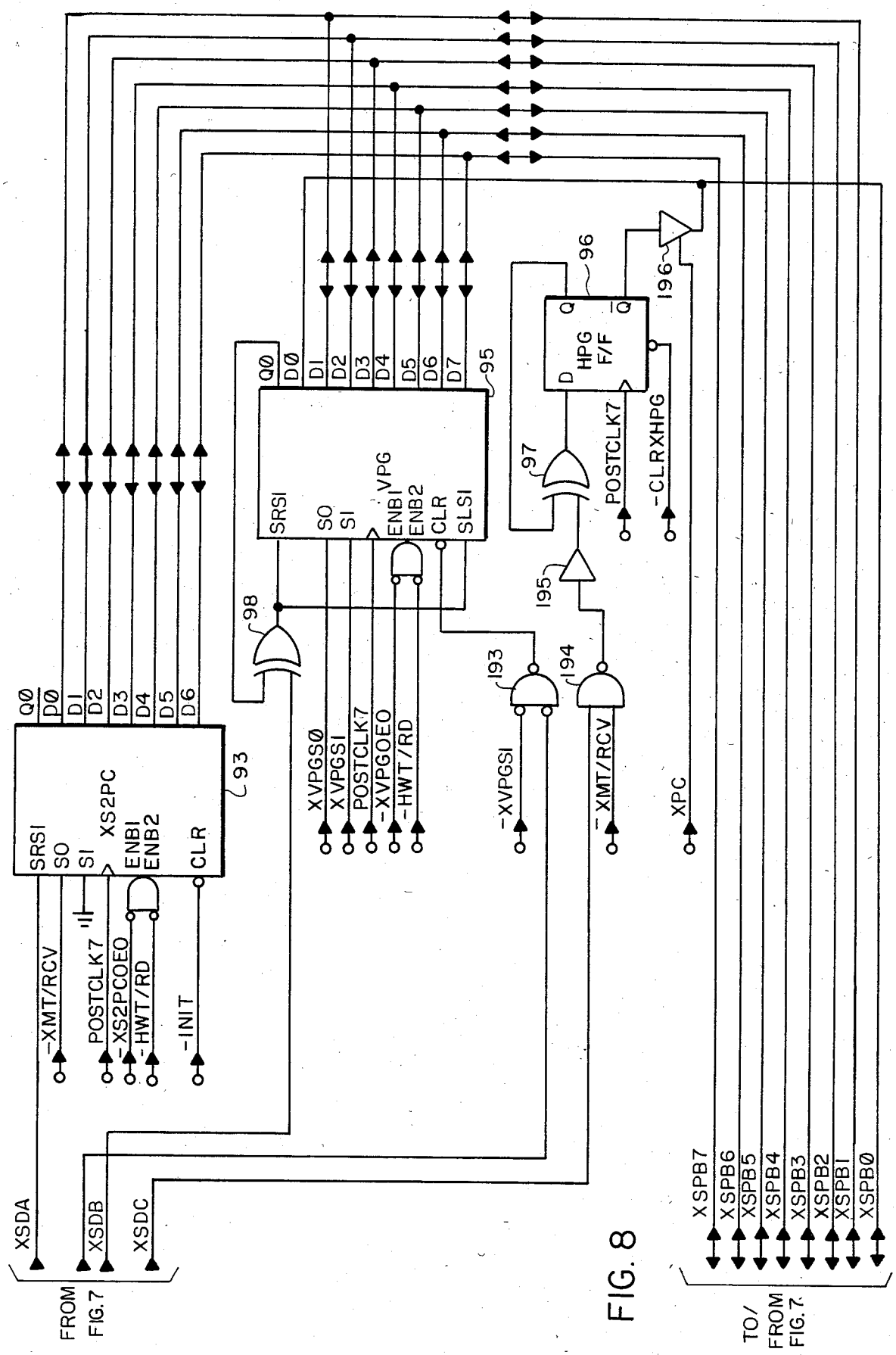
FIG. 8 is a second detailed schematic of the remote data link transmit formatter of the present invention.

Turning now to FIG. 7 and FIG. 8 a detailed schematic of the transmit formatter of the present invention is shown. The transmit formatter transmit receiver buffer (XRB) 91 is implemented by an octal three state data latch and a data transceiver (TX/RX) 94 implemented by an octal three state transceiver. XRB 91 has its inputs connected to the I/O buffer 60 via the I/O data buffer bus 62 (FIG. 4) and bus lines IODB0 through IODB7. It should be noted that the bus lines to XRB 91 from the I/O data buffer 60 are unidirectional signals to XRB 91. Data transceiver 94 has its inputs connected to the scratch pad memory 83 via a scratch pad bus 87 (FIG. 4) comprised of bidirectional scratch pad bus lines SPB0 through SPB7.

The outputs of XRB 91 and TX/RX 94 are applied to the inputs of a transmit parallel to serial converter (XP2SC) 92 which receives the data byte to be transmitted via its D0–D7 inputs and outputs the data through its Q0 output to the transmit serial to parallel converter (XS2PC) 93 and the vertical parity generator (VPG) 95. The XS2PC 93 and VPG 95 are each implemented by an 8-bit universal shift register.

The serial output of XP2SC 92 is further applied through gate 194 and driver 195 to a horizontal parity generator (HPG) 96 which is implemented by a D-type flip-flop. The outputs D0–D6 of XS2PC 93, D0–D7 of VPG 95, and Q of HPG 96 are reapplied back to the scratch pad bus 87 via bidirectional transmit scratch pad bus lines XSPB0 through XSPB7.

With reference to FIGS. 7 and 8 and also to FIG. 9 a detailed explanation of the operation of the transmit formatter of the present invention will be given. At the beginning of each formatting cycle one message byte is read from the I/O buffer 60 and transferred over the I/O data bus lines IODB0–IODB7 to XRB 91. Control signals XRB GATE and XMT/RCV are applied to XRB 91 from the RDLC timing circuitry. XRB 91 is enabled by a logic low XMT/RCV signal with the data clocked into XRB 91 by the XRB GATE input. It should be noted that the XRB GATE signal has a string of three pulses. It is the third pulse which latches the actual data. The data in XRB 91 remains stable until the next sequence of XRB GATE pulses.

Data is then read from the scratch pad memory 83 via scratch pad bus leads SPB0 through SPB7 to XP2SC 92 via TX/RX 94. Control leads HWT/RD and −XP2SCOE0 control transceiver 94 and are developed within other portions of the RDLC circuitry. Input HWT/RD provides directional control for data to or from the scratch pad memory 83. A logic low applied by this lead allows data to be read out of the scratch pad memory and a logic high allows data to be written into the scratch pad memory. A logic high −XP2SCOE0 enables transceiver 94. Data is transferred from the scratch pad memory 83 through transceiver 94 to inputs D0–D7 of XP2SC 92 when HWT/RD and −XP2SCOE0 are low and high respectively.

Data read into XP2SC 92 normally consists of one or more bits of data left over from a previous formatting cycle. A partial vertical parity check sum is also read from the scratch pad memory 83 and transferred into the D0–D7 inputs of VPG 95 via bus lines SPB0–SPB7 and XSPB0–XSPB7.

Prior to beginning the formatting cycle, HPG 96 is cleared via a −CLRXHPG signal. Data presented on the D0–D7 inputs of the XP2SC 92 is loaded into XP2SC 92 when control signals XP2SCW0 and XP2SCS1 are "0" and "1" respectively. It should be noted that the XP2SCSW0 signal provides three loads in a row. It is the third load which actually loads the data which is used during the reformatting operation. Data from the preceding loads is simply overwritten.

When control signals XP2SCSW0 and XP2SCS1 are both logic 1 XP2SC 92 will shift its data contents on each clock pulse of POSTCLK 7. Seven bits of data are then clocked out of the Q0 output of XP2SC 92. This data is applied to the SRSI input of XS2PC 93 via driver 192, the SRSI input of VPG 95 via OR gate 93 and the D input of HPG 96 via gates 194, 195 and 97. When control signal −XWT/RCV is a logic high the data presented to the SRSI input is loaded into XS2PC 93. Serial data presented to the SRSI input of VPG 95 is loaded when control signals XVPGS0 and XVPGS1 are logic "1" and "0" respectively. As each data bit is applied to gate 93 it is exclusive-ORed with the corresponding bit position in the vertical parity check sum in VPG 95. Each data bit applied to OR gate 97 is also exclusive-ORed with the horizontal parity being calculated in HPG 96.

In most cases XP2SC 92 does not contain a full set of seven valid data bits. In these cases, after the valid data bits have been shifted out of XP2SC 92 the contents of the XRB 91 will be transferred to XP2SC 92 and shifting will continue until a total of seven data bits have been transferred to XS2PC 93. When seven data bits have been shifted into XS2PC 93, the contents of XS2PC 93, VPG 95 and HPG 96 are transferred to scratch pad memory 83 via bus lines XSPB0–XSPB7 and SPB0–SPB7. It should be noted that the horizontal parity bit is appended to the least significant bit position of the XS2PC data byte via gate 196 and bus line XSPB0. Data is transferred out of the XS2PC 93 via lines D0–D6 when input signals −XS2PCOE0 and a −HWT/RD are low and high respectively. Data out of the VPG 95 is transferred out via lines D0–D7 when control signals −XVPGOE0 and −HWT/RD are low and high respectively.

Data bits left over in XP2SC 92 are transferred to the scratch pad memory 83 through transceiver 94 and the scratch pad bus lines SPB0–SPB7. The XP2SC 92 transfers its data when control inputs −XP2SCOE0 and −HWT/RD are low and high respectively.

In this manner one byte of data is prepared for transmission. This process repeats 16 times, once for each data link, until 16 bytes of data ready for transmission are stored in scratch pad memory 83. This process requires just under 104 microseconds. Every 125 microseconds the bytes of data ready for transmission are read out of the scratch pad memory 83 and transferred to the associated digital control unit output buffer DCUOB 200, 201.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a telecommunications switching system, a transmit data formatter for assembling a plurality of 8-bit data bytes into a data message containing a plurality of message bytes, each message byte having seven data bits and a parity bit, said telecommunications switching system including a peripheral processor, an output buffer arranged to receive and store said 8-bit data bytes from said peripheral processor and a temporary memory, said transmit data formatter comprising:

a receive buffer connected to said output buffer arranged to receive and store in parallel form a data byte from said output buffer when said receive buffer is empty;

a parallel to serial converter connected to said receive buffer arranged to receive said data byte from said receive buffer and output said data byte serially;

a serial to parallel converter connected to said parallel to serial converter output arranged to receive said serial data, said serial to parallel converter assembling said serial data into a partial message byte after seven data bits has been input by said serial to parallel converter; and a horizontal parity generator connected to the output of said parallel to serial converter arranged to receive said serial data, and develop and append to said partial message byte a parity bit after seven data bits has been input to said horizontal parity generator, forming said message byte, whereby said message byte is transferred to said temporary memory.

2. The transmit data formatter as claimed in claim 1, wherein: said parallel to serial converter is connected to said temporary memory and said parallel to serial converter outputs any data bits remaining in said parallel to serial converter after the assembly of a message byte to said temporary memory for inclusion in the next message byte.

3. The transmit data formatter as claimed in claim 2, wherein: said data message includes a vertical parity byte and said transmit data formatter further includes a vertical parity generator, said vertical parity generator having a serial input connected to said parallel to serial converter output arranged to receive said serial data output by said parallel to serial converter, said vertical parity generator producing and storing a vertical parity sum after seven bits have been received, and said vertical parity generator including an output connected to said temporary memory whereby, said vertical parity sum is transferred to said temporary memory when a message byte is transferred to said temporary memory.

4. The transmit data formatter as claimed in claim 3, wherein: said remaining data bits from a previous assembly of a message byte are transferred to said parallel to serial converter and said receive buffer is loaded with a second data byte, said parallel to serial converter outputting serially said remaining data bits to said serial to parallel converter and said parallel to serial converter is loaded with said second data byte when all of said remaining data bits have been output, said parallel to serial converter outputting said second data byte serially to said serial to parallel converter and said horizontal parity generator until seven data bits have been accumulated in said serial to parallel converter whereby, said horizontal parity generator develops a parity bit which is appended to said seven data bits forming a second message byte, transferring said second message byte to said temporary memory.

5. The transmit data formatter as claimed in claim 4, wherein: said vertical parity generator is loaded with said vertical parity sum from said temporary memory and a new vertical parity sum is produced and stored in said temporary memory when said second message byte is assembled.

6. The transmit data formatter as claimed in claim 4, wherein: said data message contains ten message bytes and a vertical parity byte, and after all message bytes have been assembled said vertical parity generator produces said vertical parity byte comprising seven vertical parity bits from said vertical parity sum and said horizontal parity generator produces a horizontal parity for said vertical parity byte whereby said vertical parity byte is transferred to said temporary memory.

* * * * *